(12) United States Patent
Szostkiewicz et al.

(10) Patent No.: US 10,502,897 B2
(45) Date of Patent: Dec. 10, 2019

(54) DEVICE FOR SELECTIVELY INCREASING HIGHER-ORDER MODE LOSSES IN AN OPTICAL FIBER

(71) Applicant: Polskie Centrum Fotoniki i Światłowodów, Lublin (PL)

(72) Inventors: Łukasz Szostkiewicz, Toruń (PL); Małgorzata Kuklińska, Lublin (PL); Marek Napierała, Warsaw (PL); Tomasz Nasiłowski, Warsaw (PL); Łukasz Ostrowski, Nieporęt (PL); Anna Pytel, Warsaw (PL); Michał Szymański, Warsaw (PL); Karol Wysokiński, Gdynia (PL); Anna Mąkowska, Kielce (PL); Michał Murawski, Warsaw (PL); Tadeusz Tenderenda, Warsaw (PL); Beata Bieńkowska, Warsaw (PL)

(*) Notice: Subject to any disclaimer, the term of this patent is extended or adjusted under 35 U.S.C. 154(b) by 0 days.

(21) Appl. No.: 16/165,070

(22) Filed: Oct. 19, 2018

(65) Prior Publication Data

US 2019/0049675 A1    Feb. 14, 2019

Related U.S. Application Data

(63) Continuation of application No. PCT/PL2017/050023, filed on Apr. 19, 2017.

(30) Foreign Application Priority Data

Apr. 21, 2016  (PL) .......................... 416921

(51) Int. Cl.
*G02B 6/26*  (2006.01)
*G02B 6/122*  (2006.01)
*G02B 6/255*  (2006.01)

(52) U.S. Cl.
CPC ........... *G02B 6/268* (2013.01); *G02B 6/1228* (2013.01); *G02B 6/2552* (2013.01)

(58) Field of Classification Search
None
See application file for complete search history.

(56) References Cited

U.S. PATENT DOCUMENTS 5,071,212 A * 12/1991 Mesaki .................. G02B 6/105
                                                    385/11
5,586,205 A * 12/1996 Chen ...................... G02B 6/14
                                                    349/1

(Continued)

FOREIGN PATENT DOCUMENTS

CN        101408641 A    4/2009
EP        0989422 A2     3/2000

(Continued)

OTHER PUBLICATIONS

D. Donlagic, In-line higher order mode filters based on long highly uniform fiber tapers. Journal of Lightwave Technology, 24:9:3532-3539, Sep. 2006. (Year: 2006).*

(Continued)

*Primary Examiner* — Michael Stahl
(74) *Attorney, Agent, or Firm* — The Concept Law Group, PA; Scott D. Smiley; Scott M. Garrett (57) ABSTRACT

A device for selectively increasing higher-order mode losses comprises an optical fiber taper executed on a multi-mode fiber of a selected wavelength, and the fiber taper has separated regions, i.e. non-tapered fiber regions which have a first diameter equal to that of the main fiber. The tapered regions can also include transition regions in which the fiber diameter is reduced/increased, respectively, and a taper waist region which has a reduced diameter, where the taper level ratio between the regular diameter and the narrowed diameter is at least 20%, and the length of the transition (Continued)

regions are at least 0.5 mm on one side and may be zero on the other side, and the length of the taper waist with the narrower diameter is at least 0.5 mm. Furthermore, the taper area is coated with a filtering substance with attenuating properties between the tapered section and the cladding.

18 Claims, 6 Drawing Sheets

(56) References Cited

U.S. PATENT DOCUMENTS

| | | | |
|---|---|---|---|
| 6,103,535 | A | 8/2000 | Pilevar et al. |
| 6,301,408 | B1 | 10/2001 | Espindola et al. |
| 6,697,541 | B1* | 2/2004 | Chen ................. G02B 6/02095 385/37 |
| 7,184,623 | B2 | 2/2007 | Cai et al. |
| 7,194,156 | B2 | 3/2007 | Deliwala |
| 8,384,991 | B2 | 2/2013 | Kieu et al. |
| 2003/0169965 | A1 | 9/2003 | Hanada |
| 2007/0081764 | A1* | 4/2007 | Deliwala .............. G02B 6/1228 385/29 |
| 2007/0081768 | A1 | 4/2007 | Grigsby et al. |
| 2009/0136176 | A1* | 5/2009 | Kopp ................. B29D 11/0075 385/29 |
| 2011/0255153 | A1 | 10/2011 | Holcomb et al. |
| 2013/0236153 | A1 | 9/2013 | Rochette et al. |
| 2014/0286606 | A1 | 9/2014 | Takahashi |
| 2017/0090117 | A1* | 3/2017 | Riegel ...................... G02B 6/14 |
| 2018/0267233 | A1* | 9/2018 | Bansal ............... G02B 6/02052 |

FOREIGN PATENT DOCUMENTS

| | | | |
|---|---|---|---|
| GB | 2280968 | A | 2/1995 |
| JP | 52-80133 | A * | 7/1977 |
| JP | 2001133647 | A | 5/2001 |
| WO | 2015138492 | A1 | 9/2015 |

OTHER PUBLICATIONS

Written opinion for PCT/PL2017/050023, dated Oct. 26, 2017. (Year: 2017).*

P. Yan, et al.: "A practical topological insulator saturable absorber for mode-locked fiber laser", Nature, vol. 5, Published Mar. 3, 2015, pp. 1-5.

Y. Jung, et al. : "Broadband single-mode operation of standard optical fibers by using a sub-wavelength optical wire filter", Optics Express, vol. 16, Published Sep. 3, 2008, pp. 14661-14667.

L. Jeunhomme, et al.,"Selective mode excitation of graded index optical fibers", Applied Optics, vol. 17, No. 3. , Feb. 1, 1978, pp. 463-468.

G. Stepniak, et al., "Binary-Phase Spatial Light Filters for Mode-Selective Excitation of Multimode Fibers", Journal of Lightwave Technology, vol. 29, No. 3, Jul. 1, 2011, pp. 1980-1987.

* cited by examiner

DEVICE FOR SELECTIVELY INCREASING HIGHER-ORDER MODE LOSSES IN AN OPTICAL FIBER

CROSS-REFERENCE TO RELATED APPLICATION

This application claims priority to PCT Application No. PCT/PL2017/050023, filed Apr. 19, 2017, and to its priority application, Polish Patent Application No. P.416921, filed Apr. 21, 2016, the entirety of each of which are hereby incorporated by reference.

FIELD OF THE INVENTION

The present invention relates generally to optical fiber communications, and, more particularly, relates to a device for selectively increasing losses in higher-order modes, particularly in gradient multi-mode fibers (MMF) by use of a fiber section with a tapered section that is surrounded by a light-absorbing medium. The device can be used, in particular, to increase the throughput of multi-mode transmission systems by minimizing the negative effect of inter-modal dispersion, to ensure single-mode operation in optical fiber lasers, or to improve beam quality in multi-mode optical fibers by ensuring single or few mode operation in multi-mode optical fibers.

BACKGROUND OF THE INVENTION

Increasing data throughput is one of the primary challenges for new-generation communication systems based on optical fibers. High data throughput is needed to meet the needs of continually increasing demand for growing volumes of data, as well as increased telecommunication network traffic in general. This is true for both public networks and in information processing and storage centers. Due to relatively short distances, data centers usually utilize multi-mode fibers, whose throughput is mainly limited by inter-modal dispersion or distortion. Networks of this type are often based on vertical cell surface emitting lasers (VCSEL) and multi-mode fibers (MMF), where the primary limitation is the effect of intermodal dispersion, i.e. the difference in group velocities, and thus in the propagation time for various modes causing spreading and even inter-symbol distortion. The negative effect of intermodal dispersion is expressed in impulse widening within a time domain, which results in limiting the signal throughput or transmission range.

Ensuring single-mode operation is also a challenge in the field of optical fiber laser structures. Single-mode lasers offer improved beam quality and, in some applications, it is necessary to use single-mode laser systems. One of possible solutions to the problems associated with MMFs is to insert a device for filtering out higher-order modes in the laser resonator to allow for the use of multi-mode fiber having a large core diameter as an active medium, in which only one mode will be effectively propagated. Ensuring single- or few-mode operation in a multi-mode fiber has a beneficial effect on beam quality, as it reduces the discrepancy in beam diffraction and outlet, and allows the beam to be focused in a smaller area to produce increased laser precision.

One of the ways to eliminate the adverse effects related to using multi-mode fibers is to use single-mode fibers (SMF) instead of multi-mode fibers. However, networks based on single-mode fibers are much more expensive to manufacture and install, and thus less eagerly used in data centers. The use of single-mode fibers as active media in lasers also has its limitations, resulting from non-linear effects occurring with small mode fields.

The literature includes numerous works on active systems for selecting and limiting the number of modes. For instance, a solution that limits the number of propagating modes and applying complex and costly external systems (optical filtering matrices) was published in an article by G. Stypniak, L. Maksymiuk and J. Siuzdak, titled "Binary phase spatial light filters for mode selective excitation of multimode fibers", published in the Journal of Lightwave Technology 29/13 (2011). Other known methods to reduce the number of modes require precise optical systems, used to stimulate select modes only. Examples of such techniques were published, among others, in an article by L. Jeunhomme and J. P. Pocholle, titled "Selective mode excitation of graded index optical fibers", published in Applied Optics 17/3 (1978). Due to their complex structures and high costs, the presented systems can be executed in laboratory conditions only.

Other mode filtration methods are known in which the structure of the optical fiber is modified. An example is a solution according to JP2001133647, which proposes a planar structure, where periodical changes of the lateral surface of the core cladding are used to disperse the higher-order modes leaving the core. Such a modified waveguide section can be included in the structure of a traditional optical fiber network. In addition, such an element does not require any power supply.

In turn, U.S. Pat. Pub. No 2003/169965 presents a method of filtering out higher-order modes by including in the optical fiber systems bent fibers with small-radius curvature to selectively increase higher-order mode losses. The use of small-radius curvature eliminates higher-order modes, and, as stated in the reference, transmission is more effective and faster.

Another method of modifying waveguide structure is to interfere with its chemical composition, in order to change the light propagation conditions inside the optical fiber. Such a description is included in U.S. Pat. Pub. No. 2014/286606, in which doped and non-doped regions are placed alternately, resulting in higher-order modes being scattered and attenuated.

A solution according to U.S. Pat. No. 7,194,156 presents a counterpart of an optical communication system, used to filter out higher-order modes. The structure described in this patent can be used to increase the throughput of communication systems based on multi-mode optical fibers. An element used for filtering out higher-order modes can be executed in to ways. In one of the examples, the tip of the multi-mode fiber is tapered, and the signal is led through a lens to a detector. An element constructed this way can filter out higher-order modes in a manner such that only a certain group of modes remains, where every mode reaching the detector can be treated as a separate signal. In this embodiment, signal is coupled with the use of bulk optics, which results in increasing the size of the device and additional losses.

In international patent WO2015138492 there is presented a structure for conducting quasi-multi-mode communication on multi-mode fibers. In this solution, a light signal from at least two lasers is processed by an optoelectronic transmitter optical sub-assembly (TOSA) system and coupled to a single-mode fiber in the form of a quasi-multimode signal, and then, after propagating through the transmission path, it is received by an analogue receiver optical sub-assembly (ROSA) device. The ROSA device blocks at least one higher-order mode signal.

In U.S. Pat. Pub. No. 2007/0081768 there is described an optical communication system based on multi-mode fibers, and a method to increase the throughput of this system. A part of this system is an element used to filter out higher-order modes, based on a tapering. A multi-mode optical fiber is tapered in a manner that the basic mode only is propagated in its narrowest part. A configuration for power inlet or outlet to and from a single-mode optical fiber is also presented. The system achieves the tapering using a planar tapering method.

U.S. Pat. No. 7,184,623 B2 also presents a structure that can be used to increase the throughput of telecommunication systems using multi-mode optical fibers. In this system an adiabatic coupler, possibly a tapered optical fiber, was applied to filter out higher-order modes. According to this approach, in the tapered region higher-order modes leak out of the core and are absorbed by the conventional cladding or emitted out of the cladding.

In an article by Y. Jung, G. Brambilla and D. J. Richardson, titled "Broadband single-mode operation of standard optical fibers by using a sub-wavelength optical wire filter", published in the Optics Express 16/19 (2008), they present a method of filtering out higher-order modes by applying a fiber taper. The key is to adapt the taper geometry, particularly in the transition regions. In their proposed solution, the transition regions are adiabatic for the first-order mode and simultaneously non-adiabatic—for higher-order modes. Such a taper geometry introduces large losses for higher-order modes. In order to ensure that propagation was allowed for fundamental mode only, the taper had to be $\frac{1}{100}^{th}$ of the diameter of the main core. The filtered modes are based on the glass-air threshold. A large taper level is required to introduce significant losses for high-order modes.

Coating the optical fiber taper region is used in evanescent field sensors. An exemplary evanescent field sensor is presented in U.S. Pat. No. 6,103,535 A, which describes the structure of a sensor based on an optical fiber taper coated with fluorophore-reacting material. Fluorescence takes place when the material coating the tapering reacts with the fluorophores in the presence of evanescent field in the tapered optical fiber. The key element of this reference is the material used to coat the tapering. In contact with a specific substance, this material undergoes a chemical reaction, which causes fluorescence. This type of sensor can be used with multi-mode optical fibers, which guarantee higher sensor sensitivity.

Coating an optical fiber tapered region can also be used in the structure of impulse mode-locked fiber lasers. In their publication titled "A practical topological insulator saturable absorber for mode-locked fiber laser" and published in Nature 5/8690 (2015), P. Yan, R. Lin, Sh. Ruan, A Liu, H. Chen, Y. Zheng, S. Chen, C. Guo and J. Hu presented a tapered, single-mode optical fiber SMF-28 with an saturable absorbent, which is characterized by its transparency at certain wavelengths while the signal intensity is high enough.

U.S. Pat. No. 8,384,991 discloses an invention consisting of an saturable absorbent which could be applied, among others, in the structures of impulse fiber lasers. The subject of that invention is a special substance, a mixture of carbon nanotubes and polymer composites. A fragment of the tapered optical fiber coated with this substance, is used in the structure of the impulse fiber laser.

U.S. Pat. No. 6,301,408 discloses an invention consisting of a fiber Bragg grating inscribed in an optical fiber taper region, where the taper region is coated with a special polymer. By adapting a suitable refraction index in the taper's polymer coating, it is possible to control the Bragg wavelength. According to the disclosure, the proposed structure can be used to build an add/drop multiplexer, but the properties of the fundamental mode are changed.

Therefore, a need exists to overcome the problems with the prior art as discussed above.

SUMMARY OF THE INVENTION

The invention provides a device for selectively increasing higher order mode losses in an optical fiber that overcomes the hereinafore-mentioned disadvantages of the heretofore-known devices and methods of this general type and that increases the performance of multi-mode optical fiber, increasing the distance over which multi-mode optical fiber can be used with the expense or complication associated with prior art solutions.

According to some of the embodiments of the inventive disclosure there is provided a device for selectively increasing higher-order mode losses in a fiber communication system that includes an optical fiber taper that is configured to be connected to a multi-mode fiber of a selected wavelength. The optical fiber taper includes a first non-tapered region and a second non-tapered region, each having a diameter equal to a diameter of the multi-mode fiber. The optical fiber taper further includes a waist region having a diameter that is smaller than the diameter of the first and second non-tapered regions. The optical fiber taper further includes a first transition region between the first non-tapered region and the waist region having a diameter that transitions from that of the first non-tapered region where the first transition region meets the first non-tapered region to that of the waist region where the first transition region meets the waist region. A ratio of taper is defined by a ratio of a difference in diameter between the diameter of the non-tapered regions and the diameter of the waist region over the diameter of the non-tapered regions, and the ratio of taper is at least twenty percent. The first transition region and the waist region each have a length of at least 0.5 millimeters. The device further includes a filtering substance covering at least a portion of the optical fiber taper that is selected from the group including paraffin, petroleum jelly, fatty acids, fatty acid salts, fatty acid esters, graphite, graphene, soot, carbon, polymers dissolved in polystyrene, ethyl cellulose, nitrocellulose, cellulose acetate, methyl cellulose, polyvinyl acetate, methyl methacrylate, polyvinyl chloride, ethylene-vinyl acetate, acrylic, octane-cellulose, butyl-cellulose polymers, polyimides, polyamides, polyolefins, perfluored polymers, R—Si—O organosols, polydimethylsiloxanes, polybutadiene rubber, ultraviolet-hardened polymers, epoxy resins, epoxy-acrylic resins, urethane-acrylic resins, silicone-epoxy resins, silicone-acrylic resins, epoxy-acrylic resins, organic fluids, such as: glycerin, toluene, styrene, carbon tetrachloride, carbon disulfide, silicone oil, concentrated carbohydrate solutions, immersive oil, metallic layers, metal oxides, or mixtures containing at least one of the aforementioned substances or their derivatives.

In accordance with another feature, the device can further include a second transition region between the second non-tapered region with the waist region having a diameter that transitions from that of the second non-tapered region where the second transition region meets the second non-tapered region to that of the waist region where the second transition region meets the waist region, and wherein the second transition region has a length of at least 0.5 millimeters.

In accordance with another feature, the length of the first and second transition regions are each less than 75 millimeters, and the length of the waist region is less than 75 millimeters.

In accordance with another feature, the filtering substance is carbon disulfide.

In accordance with another feature, the first and second transition regions and the waist region each have a length of 10 millimeters, the diameter of the first and second non-tapered regions are each 125 micrometers, the diameter of the waist region is 25 micrometers, and the filtering substance is colloidal graphite.

In accordance with another feature, the length of the first transition region is 5 millimeters, the length of the waist region is 10 millimeters, the diameter of the first and second non-tapered regions is 125 micrometers, the diameter of the waist region is 20 micrometers, the second non-tapered region joins directly to the waist region opposite the first non-tapered region, and the filtering substance is paraffin.

In accordance with another feature, the filtering substance is applied on at least the waist region.

In accordance with another feature, the device can further include an optical fiber cladding material surrounding the optical fiber taper, and the filtering substance is selected to attenuate the selected wavelength and has a higher refractive index than a refractive index of the optical fiber cladding material.

In accordance with another feature, the device is serially inserted in a structure of the multi-mode optical fiber, between at least one transmitter and at least one detector.

In accordance with another feature, the device is part of an optical line of a fiber laser's resonance cavity.

In accordance with another feature, the device is coupled to at least one vertical cavity surface emitting laser light source of 850 nanometers in wavelength and using either OM3 or OM4 fibers.

Although the invention is illustrated and described herein as embodied in a device for selectively increasing losses in higher order modes in an optical fiber, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient fiber structure for selectively increasing the losses of higher order modes in a multi-mode fiber communication system. Embodiments of the invention provide a tapered section of fiber that is coated with a selected optically emissive/absorptive substance where the geometry of the taper and the properties of the coating work in conjunction with each other to causes losses of higher order modes.

The purpose of the inventive embodiments is to provide a device for selectively increasing higher-order mode losses using an optical fiber element in order to increase the throughput of multi-mode transmission systems or to enable single-mode operation in fiber lasers by substantially reducing intermodal distortion due to dispersion. Its primary functionalities include: ensuring selective increase of higher-order modes' losses, passivity, small time delay, low insertion and reflection losses for selected modes, and compatibility with standard multi-mode transmission systems.

Furthermore, since the device is all-fiber, it is passive hence does not require any power supply. The device is used to reduce the negative effect of intermodal dispersion in multi-mode transmission systems of limited throughput or in those requiring complex multiple-input, multiple-output (MIMO) algorithms. In addition, due to its small length (few up to dozen or so centimeters), the device does not introduce an additional time delay in the signal. In optical fiber transmission, where data transfer speed is the primary advantage, this is a key functionality.

Figure 1:
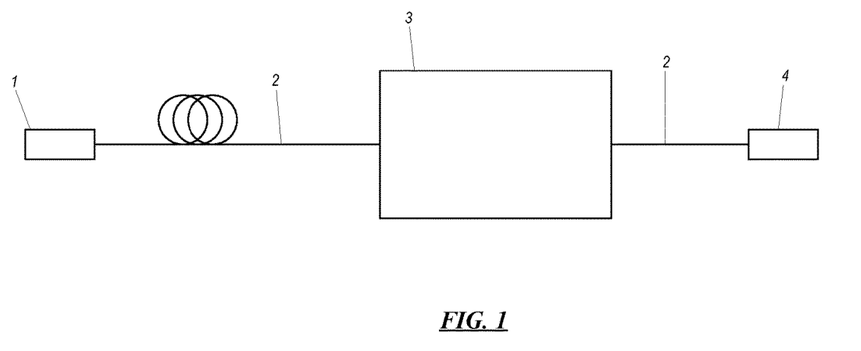
FIG. 1 is a fiber optic transmission system which selectively increases higher order mode losses, in accordance with some embodiments.
Figure 2:
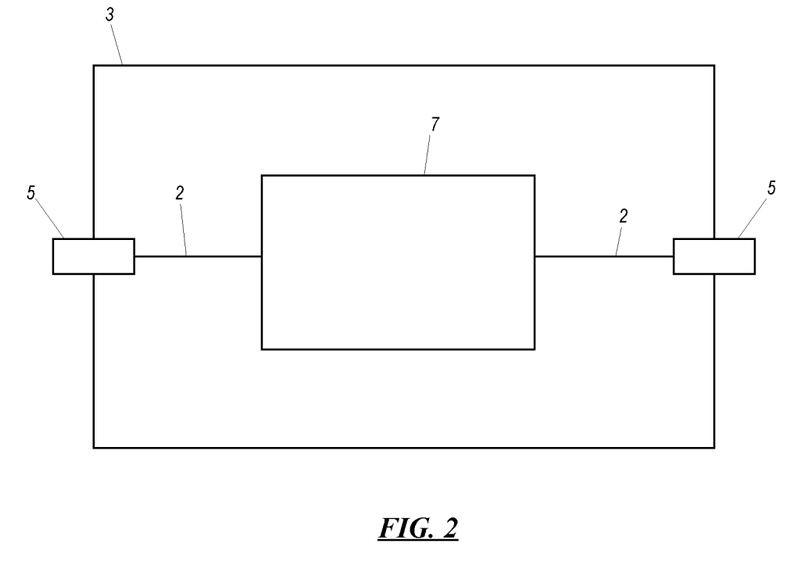
FIG. 2 is a first level detail of a device for selectively attenuating higher order mode losses, in accordance with some embodiments.
Figure 3:
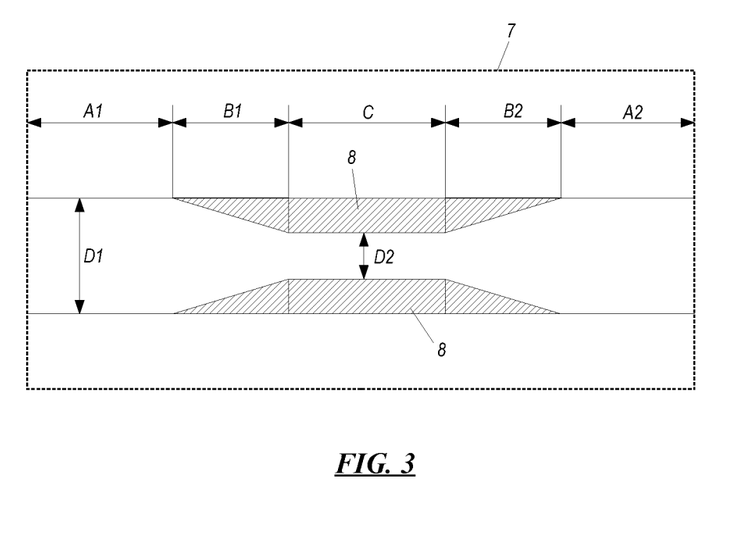
FIG. 3 shows a tapered sections coated in an light-absorbing medium the selectively increases higher order mode losses, in accordance with some embodiments.

FIGS. 1-3 show various levels of detail for a device (coated tapered fiber section) for use with OM2 or OM3 fibers, as specified in the ISO/IEC 11801 standard.

In particular, FIG. 1 shows a transmission system utilizing OM2 or OM3 fibers 2, to which signal is entered by a transmitter 1, and a device for selectively increasing higher-order mode losses 3 is incorporated in the fiber line 2, before the receiver 4.

FIG. 2 shows a first level detail of the device 3, with visible splices 5, used to connect the device in the fiber line, and the OM2 or OM3 fiber 2, on which an optical fiber taper 7 is executed.

FIG. 3 shows the optical fiber taper 7 with marked regions: of the non-tapered fiber of A1 and A2 in total lengths and of D1 in total diameter, of transition regions of B1 and B2 in total lengths, and of the taper waist region of C in total length and D2 in total diameter, where the tapered region is coated with an absorber 8. The proportions are not to scale.

Figure 4:
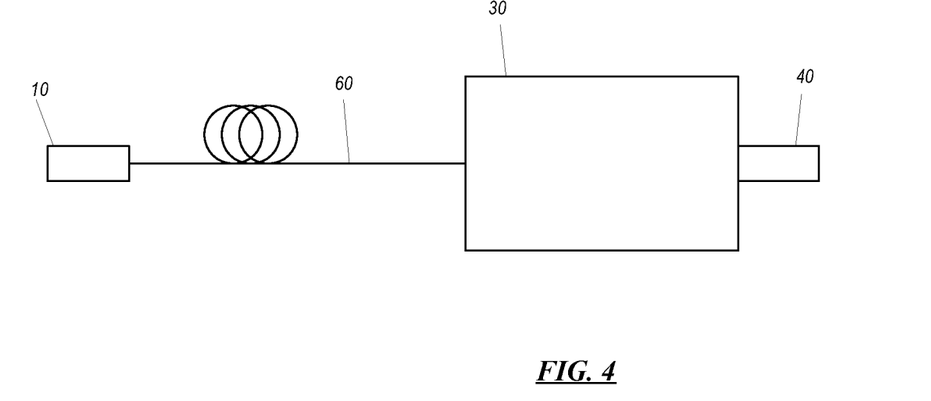
FIG. 4 shows a transmission system utilizing OM4 fiber including a device for selectively increasing higher order mode losses, in accordance with some embodiments.
Figure 5:
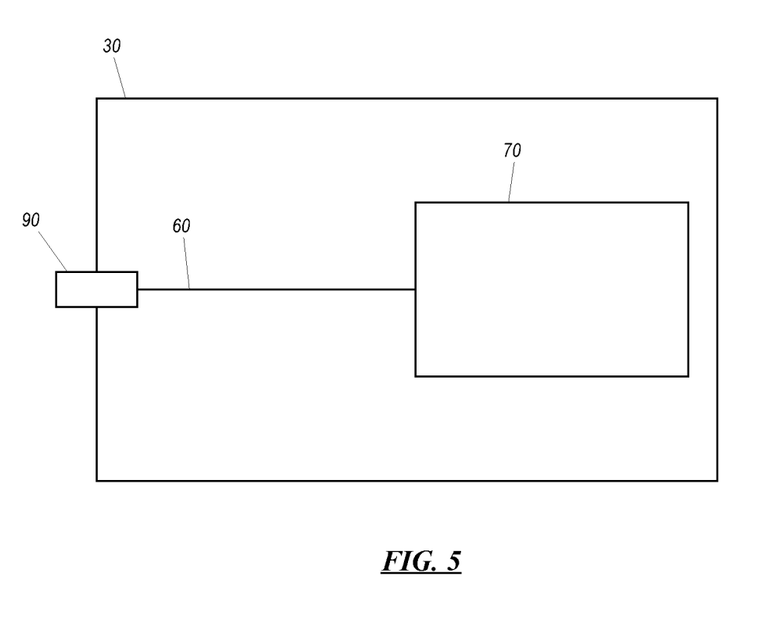
FIG. 5 shows a first level detail of the device for selectively increasing higher order mode losses in conjunction with an OM4 fiber, in accordance with some embodiments.
Figure 6:
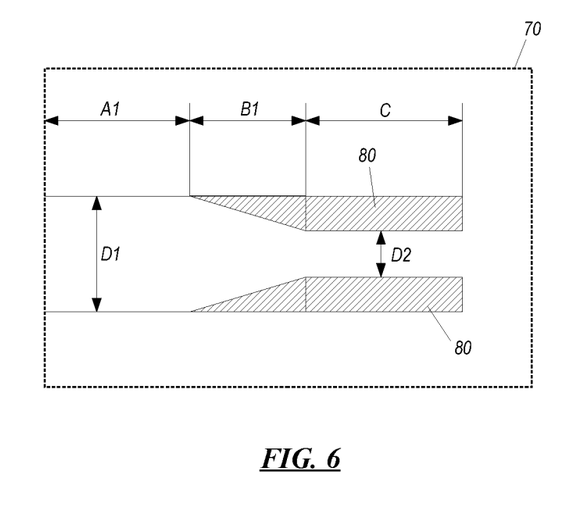
FIG. 6 shows a taper profile of the device for selectively increasing higher order mode losses in conjunction with an OM4 fiber, in accordance with some embodiments.

FIGS. 4-6 show various levels of detail for a device (coated tapered fiber section) for use with OM4 fibers, as specified in the ISO/IEC 11801 standard.

FIG. 4 presents a diagram of a transmission system utilizing an OM4 fiber 60, to which signal is coupled from a transmitter 10, and a device for selective increasing higher-order modes' losses 30 is incorporated in the fiber line 60, before the receiver 40.

FIG. 5 presents a close-up on the device 30, with a visible connector 90 for connecting the device in the optical fiber line, and the OM4 fiber 60, on which an optical fiber taper 70 is executed.

FIG. 6 presents a diagram of the optical fiber taper with marked regions: of a non-tapered optical fiber of A1 in total length and D1 in total diameter, of a transition region of decreasing diameter D1 and of a taper waist region of C in total length and D2 in total diameter, where the taper region is coated with an absorber 80. Proportions are not to scale.

Referring generally now to FIGS. 1-3, a device 3 for selectively increasing higher-order mode losses comprises at least one optical fiber taper 7 executed on a multi-mode fiber (at a specific wavelength). The optical fiber taper 7 has separated regions, i.e. non-tapered optical fiber regions A1 and A2 in which the fiber diameter equals D1 (the length of these regions A1, A2 do not affect the operation of the device 3), transition regions of B1 and B2, and a taper waist region C in which fiber diameter D2 is less than D1. The taper level or taper ratio is defined as $R=((D1-D2)/D1)*100\%$, and is preferably contained in a 20%-97% range. The length of transition region B1 is preferably from 0.5 mm to 75 mm, and the length of transition region B2 is preferably from 0 mm to 75 mm, and the length of the taper waist region C is preferably from 0.5 mm to 75 mm. The taper region between A1 and A2, including regions B1, C, and B2, is coated with a filtering substance with light attenuating properties. Whereas, in some embodiments, the filtering substance 8 is applied on at least one fragment of the optical fiber taper section, between A1 and A2.

In some embodiments, the filtering substance 8 has light attenuating properties—absorptive and/or scattering properties (on a given, utilized wavelength) and/or has a higher light refraction index than the optical fiber cladding material which surrounds all the regions from A1 to A2 and beyond in each direction. The substance 8 used in the filtering layer, which constitutes an integral part of the device 3, is preferably selected from among: paraffin, petroleum jelly or similar hydrocarbons, fatty acids, their salts or esters, graphite, graphene, soot, other forms of carbon and their derivatives, polymers dissolved in such organic solvents as polystyrene, ethyl cellulose, nitrocellulose, cellulose acetate, methyl cellulose, polyvinyl acetate, methyl methacrylate and their derivatives, polymers with low softening temperatures, such as polyvinyl chloride, ethylene-vinyl acetate, acrylic, octane-cellulose, butyl-cellulose polymers, polyimides, polyamides, polyolefins, perfluored polymers, R—Si—O organosols, polydimethylsiloxanes, polybutadiene rubber, ultraviolet-hardened polymers, epoxy resins, epoxy-acrylic resins, urethane-acrylic resins, silicone-epoxy resins, silicone-acrylic resins, epoxy-acrylic resins, organic fluids, such as: glycerin, toluene, styrene, carbon tetrachloride, carbon disulfide, silicone oil, concentrated carbohydrate solutions, immersive oil, metallic layers, metal oxides or mixtures containing at least one of the aforementioned substances or their derivatives.

In some embodiments, a serial connection of the device 3 into an optical fiber line is preferably executed through splicing or connectors. In some embodiments, the taper 7 can be executed directly on the optical fiber forming the optical fiber line. In some embodiments, taper 7 can be also included in the detector (receiver).

In some embodiments, a taper 7 executed on an optical fiber in accordance with the OM2 or OM3 standards has the following dimensions: B1=B2=10 mm, C=10 mm, D1=125 μm, D2=25 μm (R=80%), and the connection of the device 3 with the optical fiber line is executed in the form of a splice between a fiber and the optical fiber taper 7, whereas the multi-mode optical fiber used is executed according to the OM2 or OM3 standard. In some embodiments, the taper region is coated with a filtering substance 8 which is an absorbent such as colloidal graphite.

In some embodiments of FIGS. 4-6, a taper 70 executed on an optical fiber according to the OM4 standard has the following dimensions: B1=5 mm, B2=0 mm, C=10 mm, D1=125 μm, D2=20 μm (R=84%), and the connection of the device with the optical fiber line is executed in the form of a fiber connector between a fiber and the optical fiber taper 70, whereas the multi-mode optical fiber used is executed according to the OM4 standard and the filtering substance can be paraffin.

In some embodiments, a taper 7, 70 executed on a multi-mode step-index optical fiber, numerical aperture of 0.37 (defined as a square root of the difference of the core's refractive index, squared, and the casing's refractive index, squared), of 100 μm in core diameter and 300 μm in casing diameter, has the following dimensions: B1=30 mm, B2=20 mm, C=20 mm, D1=300 μm, D2=9 μm (R=97%), and is coated with a filtering substance covering the taper region 7, 70 that consists of carbon disulfide.

In some embodiments the device 3, 30 for selectively increasing higher-order mode losses is serially connected to the multi-mode fiber's structure, between at least one transmitter and at least one detector (receiver), preferably close to the detector, or, in another embodiment, the device 3, 30 is an element of an optical line as part of a fiber laser's resonator cavity.

In some embodiments a specific device configuration is set with at least one VCSEL light source at 850 nm and uses OM3 or OM4 fibers.

What is claimed is:

1. A device for selectively increasing higher-order mode losses in a fiber communication system, comprising:
   an optical fiber taper, configured to be connected to a multi-mode fiber of a specific wavelength, the optical fiber taper comprising:
   a first non-tapered region and a second non-tapered region, each having a diameter equal to a diameter of the multi-mode fiber;
   a waist region having a diameter that is smaller than the diameter of the first and second non-tapered regions;
   a first transition region between the first non-tapered region and the waist region having a diameter that transitions from that of the first non-tapered region where the first transition region meets the first non-tapered region to that of the waist region where the first transition region meets the waist region;
   wherein a ratio of taper is defined by a ratio of a difference in diameter between the diameter of the first and second non-tapered regions and the diameter of the waist region over the diameter of the first and second non-tapered regions, and the ratio of taper is at least twenty percent;
   wherein the first transition region and the waist region each have a length of at least 0.5 millimeters;
   a filtering substance covering at least a portion of the optical fiber taper at the waist region, and wherein the filtering substance has at least one of emissive, absorptive, or light attenuating properties;
   wherein the filtering substance is selected from a group including paraffin, petroleum jelly, fatty acids, fatty acid salts, fatty acid esters, graphite, graphene, soot, carbon, polymers dissolved in polystyrene, ethyl cellulose, nitrocellulose, cellulose acetate, methyl cellulose, polyvinyl acetate, methyl methacrylate, polyvinyl chloride, ethylene-vinyl acetate, acrylic, octane-cellulose, butyl-cellulose polymers, polyimides, polyamides, polyolefins, perfluored polymers, R—Si—O organosols, polydimethylsiloxanes, polybutadiene rubber, ultraviolet-hardened polymers, epoxy resins, epoxy-acrylic resins, urethane-acrylic resins, silicone-epoxy resins, silicone-acrylic resins, metallic layers, metal oxides, glycerin, toluene, styrene, carbon tetrachloride, carbon disulfide, silicone oil, concentrated carbohydrate solutions, immersive oil, or mixtures thereof;
   an optical fiber cladding material surrounding the optical fiber taper; and
   wherein the filtering substance has a higher refractive index than a refractive index of the optical fiber cladding material.

2. The device of claim 1, further comprising a second transition region between the second non-tapered region and the waist region having a diameter that transitions from that of the second non-tapered region where the second transition region meets the second non-tapered region to that of the waist region where the second transition region meets the waist region, and wherein the second transition region has a length of at least 0.5 millimeters.

3. The device of claim 2, wherein the taper ratio is not greater than 97%, the length of the first and second transition regions are each less than 75 millimeters, and the length of the waist region is less than 75 millimeters.

4. The device of claim 3, wherein the filtering substance is carbon disulfide.

5. The device of claim 2, wherein the first and second transition regions and the waist region each have a length of 10 millimeters, the diameter of the first and second non-tapered regions are each 125 micrometers, the diameter of the waist region is 25 micrometers, and the filtering substance is colloidal graphite.

6. The device of claim 1, wherein the length of the first transition region is 5 millimeters, the length of the waist region is 10 millimeters, the diameter of the first and second non-tapered regions is 125 micrometers, the diameter of the waist region is 20 micrometers, the second non-tapered region joins directly to the waist region opposite the first non-tapered region, and the filtering substance is paraffin.

7. The device of claim 1, wherein the device is serially inserted in a structure of the multi-mode fiber, between at least one transmitter or at detector and at least one transmitter and one detector.

8. The device of claim 1, wherein the device is part of an optical line of a fiber laser's resonance cavity.

9. The device of claim 1, wherein the device is coupled to at least one vertical cavity surface emitting laser light source of 850 nanometers in wavelength and using either OM3 or OM4 fibers.

10. A device for attenuating higher-order modes an optical fiber communication system, comprising:
- a multimode optical fiber for a selected wavelength having a core in which an optical fiber taper is formed, the optical fiber taper comprising:
  - a first non-tapered region and a second non-tapered region, each having a diameter equal to a diameter of the multi-mode fiber;
  - a waist region having a diameter that is smaller than the diameter of the first and second non-tapered regions;
  - a first transition region between the first non-tapered region and the waist region having a diameter that transitions from that of the first non-tapered region where the first transition region meets the first non-tapered region to that of the waist region where the first transition region meets the waist region;
  - wherein a ratio of taper is defined by a ratio of a difference in diameter between the diameter of the first and second non-tapered regions and the diameter of the waist region over the diameter of the first and second non-tapered regions, and the ratio of taper is at least twenty percent;
  - wherein the first transition region and the waist region each have a length of at least 0.5 millimeters;
- a filtering substance that attenuates the selected wavelength and which is disposed over at least a portion of the waist region;
- an optical fiber cladding material surrounding the optical fiber taper and having a refractive index; and
- wherein the filtering substance has a higher refractive index than the refractive index of the optical fiber cladding material.

11. The device of claim 10, wherein the filtering substance is selected from a group including paraffin, petroleum jelly, fatty acids, fatty acid salts, fatty acid esters, graphite, graphene, soot, carbon, polymers dissolved in polystyrene, ethyl cellulose, nitrocellulose, cellulose acetate, methyl cellulose, polyvinyl acetate, methyl methacrylate, polyvinyl chloride, ethylene-vinyl acetate, acrylic, octane-cellulose, butyl-cellulose polymers, polyimides, polyamides, polyolefins, perfluored polymers, R—Si—O organosols, polydimethylsiloxanes, polybutadiene rubber, ultraviolet-hardened polymers, epoxy resins, epoxy-acrylic resins, urethane-acrylic resins, silicone-epoxy resins, silicone-acrylic resins, metallic layers, metal oxides, glycerin, toluene, styrene, carbon tetrachloride, carbon disulfide, silicone oil, concentrated carbohydrate solutions, immersive oil, or mixtures thereof.

12. The device of claim 10, further comprising a second transition region between the second non-tapered region and the waist region having a diameter that transitions from that of the second non-tapered region where the second transition region meets the second non-tapered region to that of the waist region where the second transition region meets the waist region, and wherein the second transition region has a length of at least 0.5 millimeters.

13. The device of claim 10, wherein the filtering substance is carbon disulfide.

14. The device of claim 12, wherein the first and second transition regions and the waist region each have a length of 10 millimeters, the diameter of the first and second non-tapered regions are each 125 micrometers, the diameter of the waist region is 25 micrometers, and the filtering substance is colloidal graphite.

15. The device of claim 10, wherein the length of the first transition region is 5 millimeters, the length of the waist region is 10 millimeters, the diameter of the first and second non-tapered regions is 125 micrometers, the diameter of the waist region is 20 micrometers, the second non-tapered region joins directly to the waist region opposite the first non-tapered region.

16. The device of claim 10, wherein the device is serially inserted in a structure of the multi-mode fiber, between at least one transmitter and at least one detector.

17. The device of claim 10, wherein the device is part of an optical line of a fiber laser's resonance cavity.

18. The device of claim 10, wherein the device is coupled to at least one vertical cavity surface emitting laser light source of 850 nanometers in wavelength and using either OM3 or OM4 fibers.

* * * * *